US012762710B2

(12) United States Patent
Chen

(10) Patent No.: US 12,762,710 B2
(45) Date of Patent: Oct. 13, 2026

(54) METHODS AND APPARATUS FOR CATEGORY SELECTIVE REPRESENTATION OF OCCLUDING CONTOURS FOR IMAGES

(71) Applicant: Tianlong Chen, Germantown, MD (US)

(72) Inventor: Tianlong Chen, Germantown, MD (US)

( * ) Notice: Subject to any disclaimer, the term of this patent is extended or adjusted under 35 U.S.C. 154(b) by 773 days.

(21) Appl. No.: 17/736,651

(22) Filed: May 4, 2022

(65) Prior Publication Data

US 2023/0360223 A1 Nov. 9, 2023

(51) Int. Cl.
*G06T 7/149* (2017.01)
*G06V 10/44* (2022.01)

(52) U.S. Cl.
CPC .............. *G06T 7/149* (2017.01); *G06V 10/44* (2022.01); *G06T 2207/20081* (2013.01); *G06T 2207/20084* (2013.01)

(58) Field of Classification Search
None
See application file for complete search history.

(56) References Cited

U.S. PATENT DOCUMENTS 11,282,293 B2 * 3/2022 Chen ........................ G06N 3/08
2015/0131897 A1 * 5/2015 Tsao ........................ G06T 7/564
382/154
2019/0272433 A1 * 9/2019 Yu .......................... G06V 20/56
2020/0342652 A1 * 10/2020 Rowell .................. G06V 10/82
2023/0260161 A1 * 8/2023 Shin ........................ G06N 3/04
382/158

OTHER PUBLICATIONS

Ernst MR, Burwick T, Triesch J. Recurrent processing improves occluded object recognition and gives rise to perceptual hysteresis. J Vis. Dec. 1, 2021;21(13):6. doi: 10.1167/jov.21.13.6. PMID: 34905052; PMCID: PMC8684313. (Year: 2021).*

B. Hu, S. Khan, E. Niebur and B. Tripp, "Figure-ground representation in deep neural networks," 2019 53rd Annual Conference on Information Sciences and Systems (CISS), Baltimore, MD, USA, 2019, pp. 1-6, doi: 10.1109/CISS.2019.8693039. (Year: 2019).*

Edward Craft, "A Neural Model of Figure-Ground Organization",Apr. 18, 2007, J Neurophysiol 97: 4310-4326, 2007, doi: 10.1152/jn.00203.2007.pp. 4310-4315 (Year: 2007).*

Edward Craft, Hartmut Schütze, Ernst Niebur and Rüdiger von der Heydt J Neurophysiol, "A Neural Model of Figure-Ground Organization" 97:4310-4326, 2007. (Year: 2007).*

Markus R. Ernst, Thomas Burwick, Jochen Triesch, "Recurrent processing improves occluded object recognition and gives rise to perceptual hysteresis" Journal of Vision 2021. (Year: 2021).*

* cited by examiner

*Primary Examiner* — Mark R Milia

(57) ABSTRACT

The present invention discloses methods and apparatuses of coding category-selective representation of occluding contours on an image with or without border-ownership; the invention further discloses methods and apparatuses for generating such category-selective representation of occluding contours on an image with or without border-ownership for a given image by training and using neural networks.

5 Claims, 10 Drawing Sheets

METHODS AND APPARATUS FOR CATEGORY SELECTIVE REPRESENTATION OF OCCLUDING CONTOURS FOR IMAGES

FIELD OF THE INVENTION

The present invention is related to methods and apparatus of category-selective representation of occluding contours on an image with or without border-ownership; occluding contours with border-ownership effectively separate objects, can be considered as segmentation of objects; and the present invention is also related to systems and methods of using deep neural networks, given an image, to generate such a category-selective representation of occluding contours for a given image with or without border-ownership; the image could be single static image, or one image from image sequence or one image frame from video.

BACKGROUND OF THE INVENTION

Referring to my Patent (U.S. Pat. No. 11,282,293) of "Methods and Apparatus for Border-ownership Representation of Occluding Contours for Images" (called "Border-ownership Patent" herein to simplify the description throughout the description of this invention if not otherwise specify), the disclosed invention herein of category-selective representation was the direct extension from the border-ownership representation disclosed in Border-ownership Patent. Both works were initially done in September 2019.

In neuroscience, it has been found that "Areas that are selective for categories such as faces, bodies, and scenes" as was stated in the paper from Pinglei Bao et al., 2020. Many other papers in the past many years have mentioned and reported such category-selectivity exists in monkey/human brain.

Further, the paper "Figure-ground organization in the visual cortex: does meaning matter?" by Hee-kyoung Ko et al., 2018 states that "Surprisingly, this category selectivity appeared as early as 70 ms after stimulus onset, . . . indicate sophisticated shape categorization mechanisms that are much faster than generally assumed."; and the paper from Rudiger von der Heydt "Figure-ground organization and the emergence of proto-objects in the visual cortex"says" . . . the experimentally observed onset of border ownership signal which occurs as early as 10-35 ms after the response onset." Putting the experimental evidences together, it seems to hint that some kind of category-selectivity may happen at the same time as border-ownership is coded. I was convinced by the hints from the neuroscience findings; the natural extension (called TcNet2 herein in this invention) from my border-ownership work as disclosed in the Border-ownership Patent is to include such category-selectivity as separate branches in my neural network TcNet (referring to my Border-ownership Patent for more detail).

And our experiments showed that the TcNet with category-selective extension can create border-ownership coding of occluding contour for an image at the same time to create category-selective representation of occluding contours for the image.

Note that such category-selectivity in neural network referred herein is not a top-down guided process.

Though the TcNet2, described below in this invention, with border-ownership and category-selectivity together, if such pure bottom-up category-selectivity as general classification for ALL categories, are way too expensive (one branch per category, millions of categories would mean millions of categories, see more detail below), and which seems not practical. Fortunately, referring to paper from Pinglei Bao et al., there are certain category-selective areas for limited and targeted (i.e. selective) categories such as face, body, and scenes in monkey/human brain; therefore TcNet2 is more likely to simulate such limited and targeted category-selective separation and segmentation. That is, such limited and targeted category selective separation can include some most common object targets such as persons, or vehicles, or face, and so on. And our experiments confirm my thoughts.

It is worth noticing that such category-selective representation of occluding contours in TcNet2 herein seems less prone under occlusion based on our limited experiments.

By general definition from Google search engine, 'category' is defined as 'a class or division of people or things regarded as having particular shared characteristics'. Still referring to the paper "Figure-ground organization in the visual cortex: does meaning matter?" by Hee-kyoung Ko et al., 2018, it says that " . . . the presence of shape classification mechanisms that are much faster than previously assumed". Our experiments show that the TcNet2 with border-ownership and category-selectivity together is more shape-selective than just general category selective; or to say, the 'category' here in this invention is referred to as category that shares similar shape characteristics, and may also share certain surrounding characteristics. Any objects with uniquely different shapes are much easier to be separated from each other than similarly shaped objects; or to say, similarly shaped objects are more likely to be considered to belong to the same 'category' from the 'shape' point of view.

SUMMARY OF THE INVENTION

The present invention discloses methods and apparatuses of coding category-selective representation of occluding contours on an image with or without border-ownership; the invention further discloses methods and apparatuses for generating such category-selective representation of occluding contours on an image with or without border-ownership for a given image by training and using neural networks.

BRIEF DESCRIPTION OF THE DRAWINGS

Exemplary embodiments of the present disclosure are shown in the drawings and will be explained in detail in the description that follows.

FIG. 4 is all-category contours of all objects of all categories in the given image FIG. 3; FIG. 5 is a 2-channel border-ownership map, red color indicating 1-channel border-ownership channel of all objects in which the owner of a contour segment (or called border segment, see more detail in the Border-ownership Patent) is either 'below' or 'left' side of the contour segment, providing that all contours can be separated into more relatively straight contour segments (referring to Border-ownership Patent for more detail), whereas green color indicating another border-ownership channel in which the owner of a contour segment is either 'above' or 'right' side of the contour segment. FIG. 6 is a category map of 'persons'; FIG. 7 is a category map of 'cups'; FIG. 8 is a category map of 'airplanes'; FIG. 9 is a category map of 'cars'; and FIG. 10 is a category map of 'chairs'. The category model images of 'airplane', 'car', 'cup', 'chair' and 'person' are from Princeton ModelNet from Zhirong Wu et al.

DESCRIPTION OF THE PREFERRED EMBODIMENT

Figure 1:
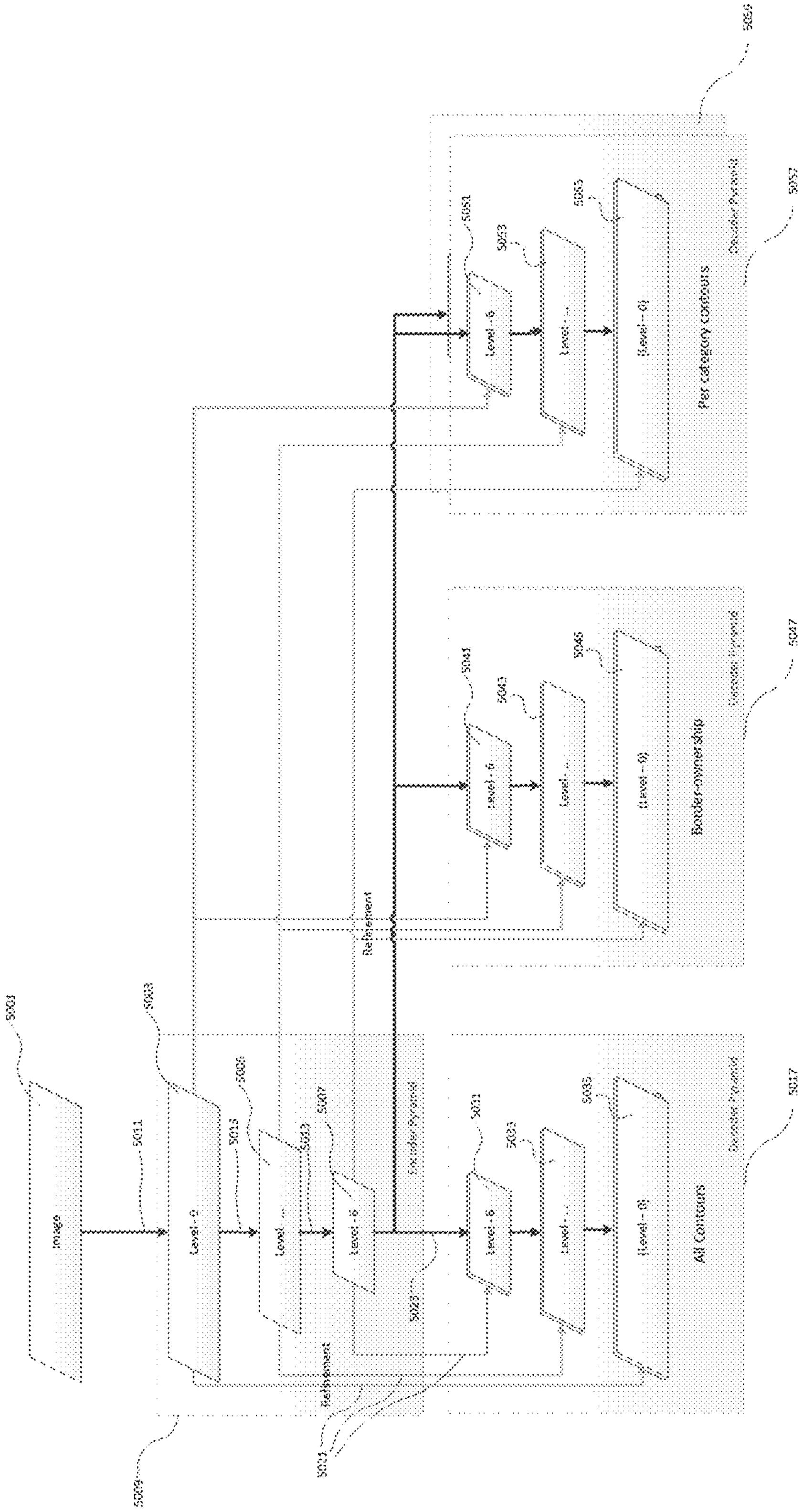
FIG. 1 is an extension from previous FIG. 5 in my Border-ownership Patent application, it is a schematic diagram of an encoder-decoder convolutional neural network to generate a 1-channel whole occluding contour map, and a contour border-ownership coding map, and several per-category contour maps (separate category contour map per category) for a given input image 5001. In the schematic diagram of TcNet in FIG. 1, 5003 is layer-0, 5005 represents layers 1 to 5, 5007 is the last layer, layer 6, in the Encoder Pyramid 5009, and 5011 is input from image to layer 0 in Encoder Pyramid 5009, 5013 is input from layers to their next layers; 5031, 5033 and 5035 are layers in "All-contour" branch in Decoder Pyramid 5017 corresponding to layers in Encoder Pyramid 5009 as illustrated in FIG. 1, similarly for 5041, 5043 and 5035 are layers in "Border-ownership" branch in Decoder Pyramid 5047, and 5051, 5053 and 5035 are layers in each "Per category-contour" branch in Decoder Pyramid 5057: each layer from Encoder Pyramid 5009 has "Refinement" input 5021 to their corresponding layer in every branch in Decoder Pyramid 5017, 5047, 5057.

Exemplary embodiments of the invention are shown in the drawings and will be explained in detail in the description that follows.

In my previous Border-ownership Patent, an exemplary neural network TcNet and its variants were disclosed to generate a map of all contours in a branch (called "all-contour branch" herein to simplify the description, which was referred to as 'additional 1$^{st}$ branch' in Border-ownership Patent, 5017 in FIG. 1) and an exemplary 2-channel map of border-ownership in another branch (called "border-ownership branch" herein to simplify the description in this invention).

Figure 5:
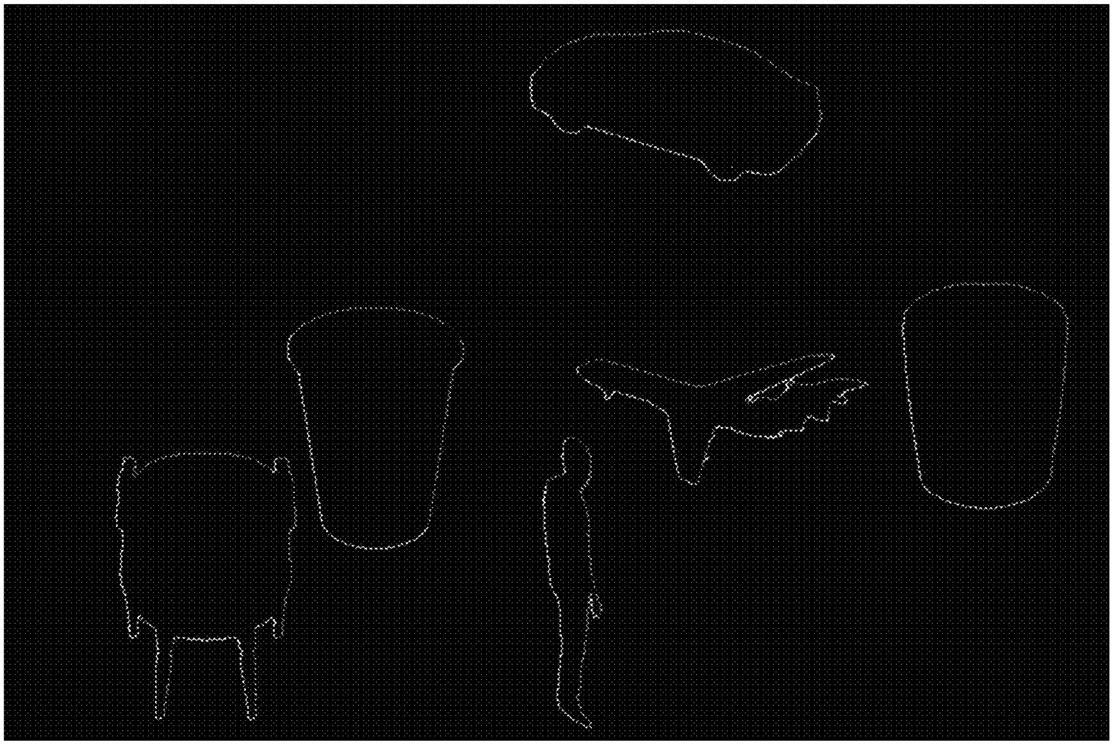
Figure 6:
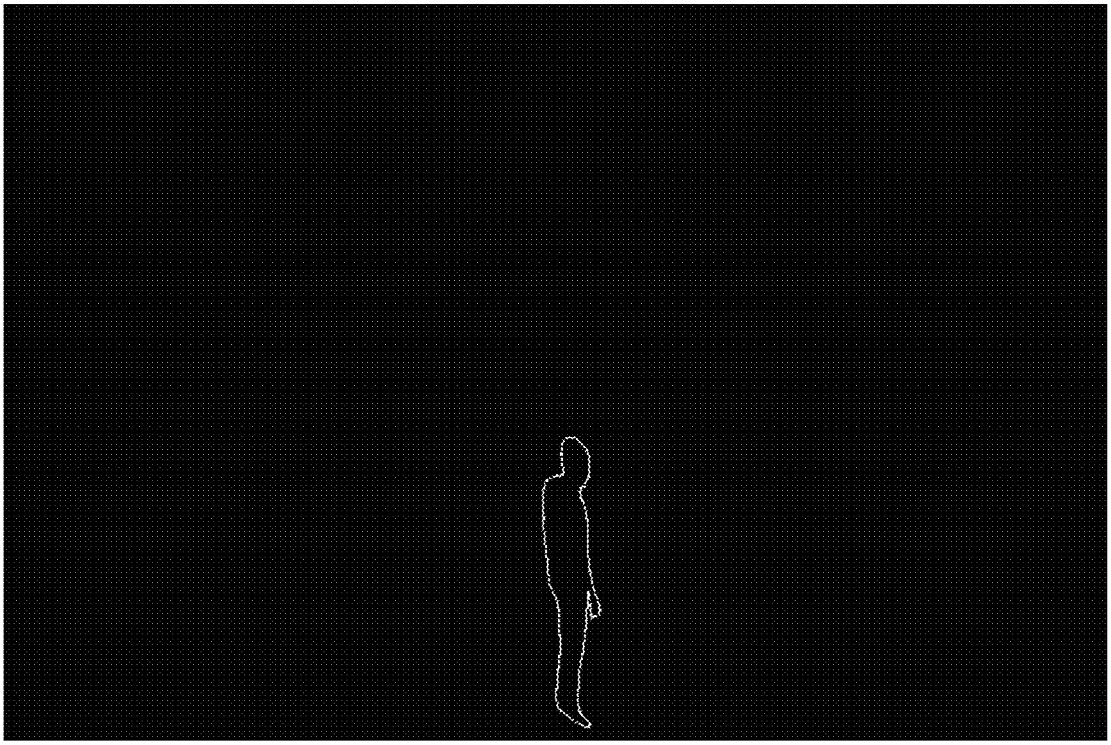
Figure 7:
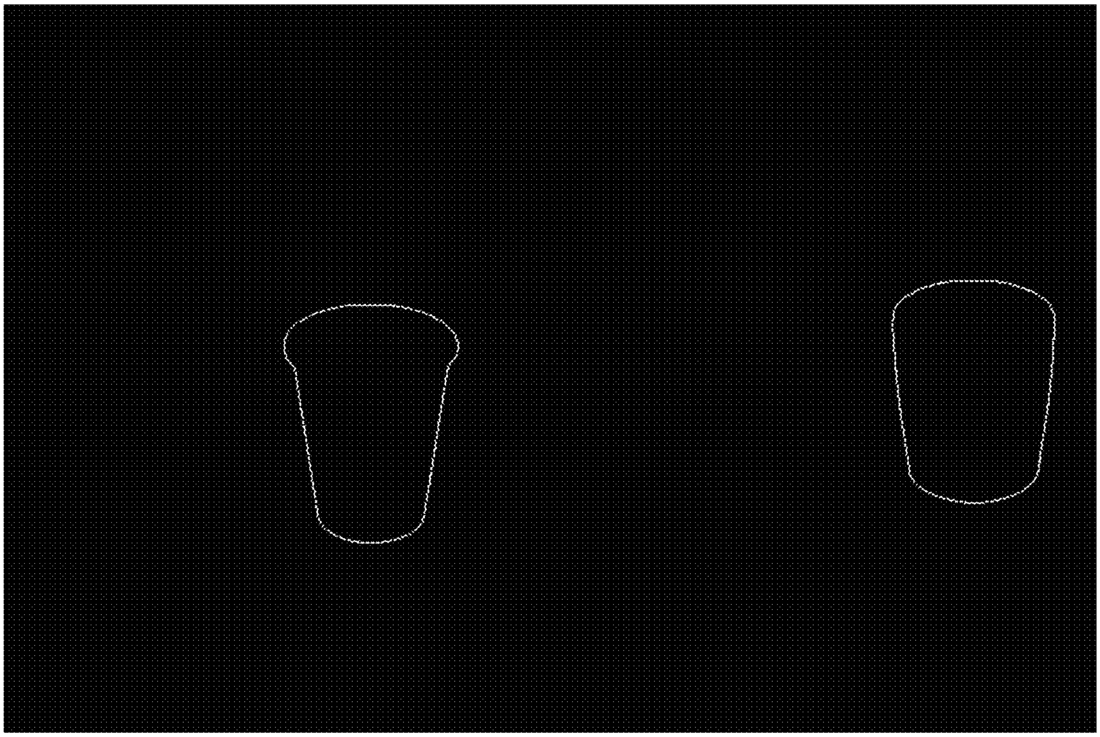
Figure 8:
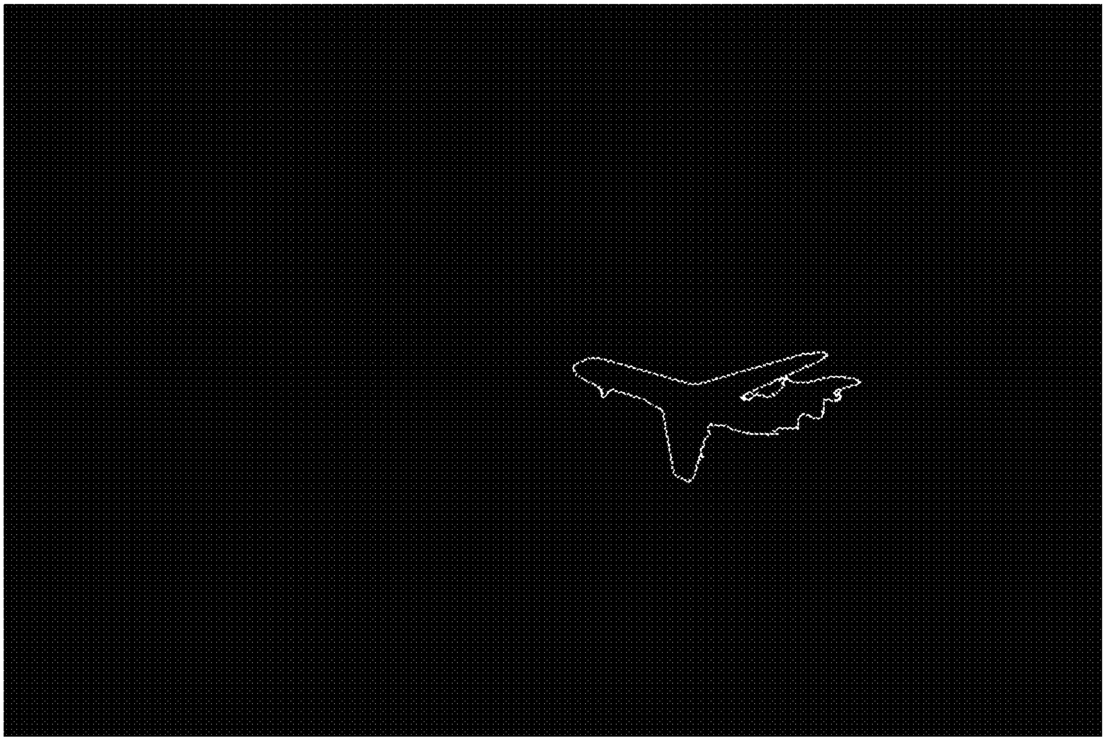
Figure 9:
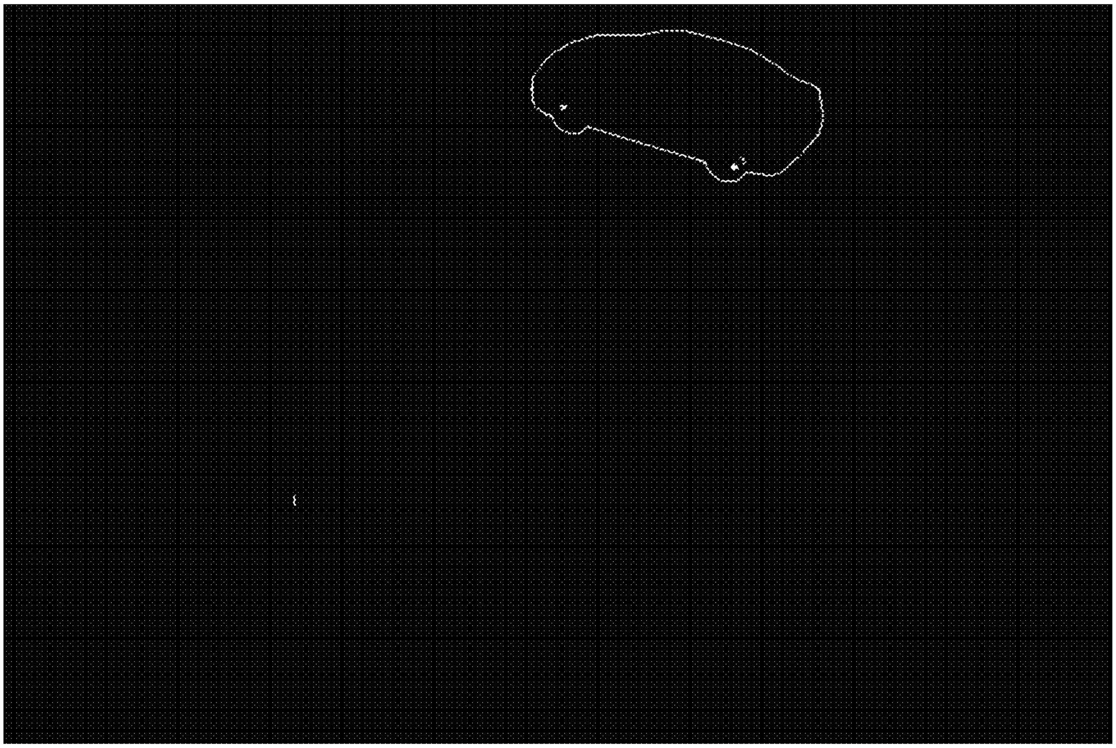
Figure 10:
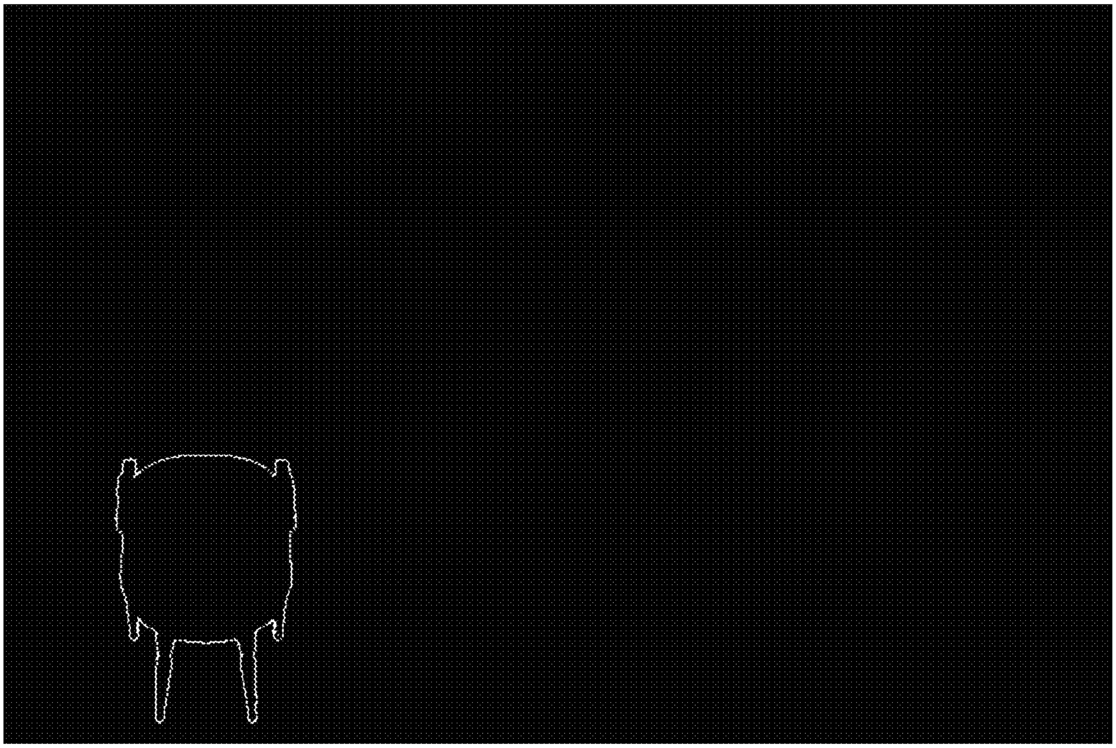

Extending from the TcNet in Border-ownership Patent with border-ownership to include category-selectivity is very simple and natural. Referring to FIG. 1 in this invention, a new exemplary embodiment TcNet variant extending from FIG. 5 in Border-ownership Patent to generate per-category contour maps, each category (one channel per category, i.e. 1-1 relation between category and channel, called 'category channel' herein) has a separate single-channel branch (5057, 5059, called 'per-category branch' herein) which is same as that of all-contour branch (5017) in network structure. To simplify the description, the new TcNet with both border-ownership and category-selectivity is referred as TcNet2 herein in this invention. And the exemplary 2-channel border-ownership coding is used as example to simplify the description, more-channel border-ownership like 4- or 8-channel border-ownership coding can be used as was disclosed in the Border-ownership Patent.

Same as the Border-ownership Patent, when training the exemplary TcNet2, referring to FIG. 1, each level (5031, 5033, . . . ,5035) in the Decoder Pyramid 5017 in the all-contour branch will be matched against ground truth contour maps in proper resolutions of all objects of all categories in an input image 5001; each level (5041, 5043, . . . , 5045) in the Decoder Pyramid 5047 in the border-ownership branch will be matched against ground truth 2-channel border-ownership maps of proper resolutions of all objects in an input image 5001; referring to the Border-ownership Patent for the detailed description of training TcNet. Similarly in TcNet2 extended from TcNet, each per-category contour branch 5057,5058 is identical to that 5047 of all-contour branch in neural network structure; each level (5051,5053, . . . ,5055) in the Decoder Pyramid 5057 or 5059 in one per-category contour branch will be matched against ground truth contour maps in proper resolutions of all objects from one particular category in an input image 5001, in which occluded portion of any objects will be excluded but occluding borders between objects will survive. If there is no object from a selected category in an input image, then the associated ground truth per-category contour map will be empty.

For an exemplary case of 2-channel border-ownership and N categories, each ground truth set for training TcNet2 would include a 3-channel (color) image or 1-channel (gray) image, and 1+2+N-channel contour-border-ownership maps which includes 1-channel all-contour map of all selected categories, 2-channel border-ownership maps, and N-channel category maps with one 1-channel map per each category in which only particular category object contours appear.

In the present invention, one category is represented by one channel. However, it is possible that one object may belong to more than one category. Therefore, occluding contours of such an object could appear in more than one category channel.

Figure 2:
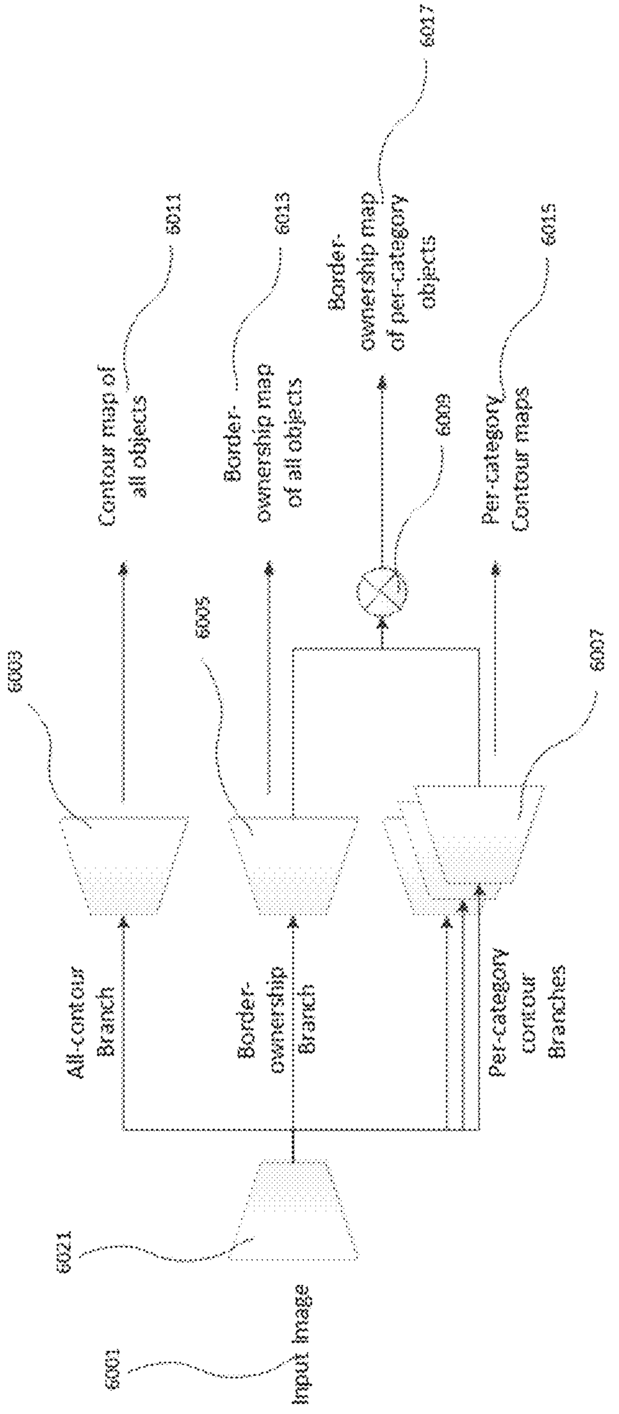
FIG. 2 is another simplified schematic diagram of FIG. 1 TcNet2 with an input image, outputs all-contour map ('all-contour' herein in this invention means all contours of objects from all selected categories excluding those unselected categories; and 'all objects' are herein referred to objects belonging to all selected categories; in practice, 'all objects' are referred to those selected objects belonging to all selected categories especially for ground truth generation due to object size, limitation of human involvement of ground truth generation and so on; similarly 'all categories' are referred to all selected categories), border-ownership map, and per-category contour maps (one different contour map per category) when the exemplary TcNet2 is evaluated after training; also a per-category border-ownership map for a category can be obtained by an inner product of border-ownership map and per-category contour map of that category.
Figure 3:
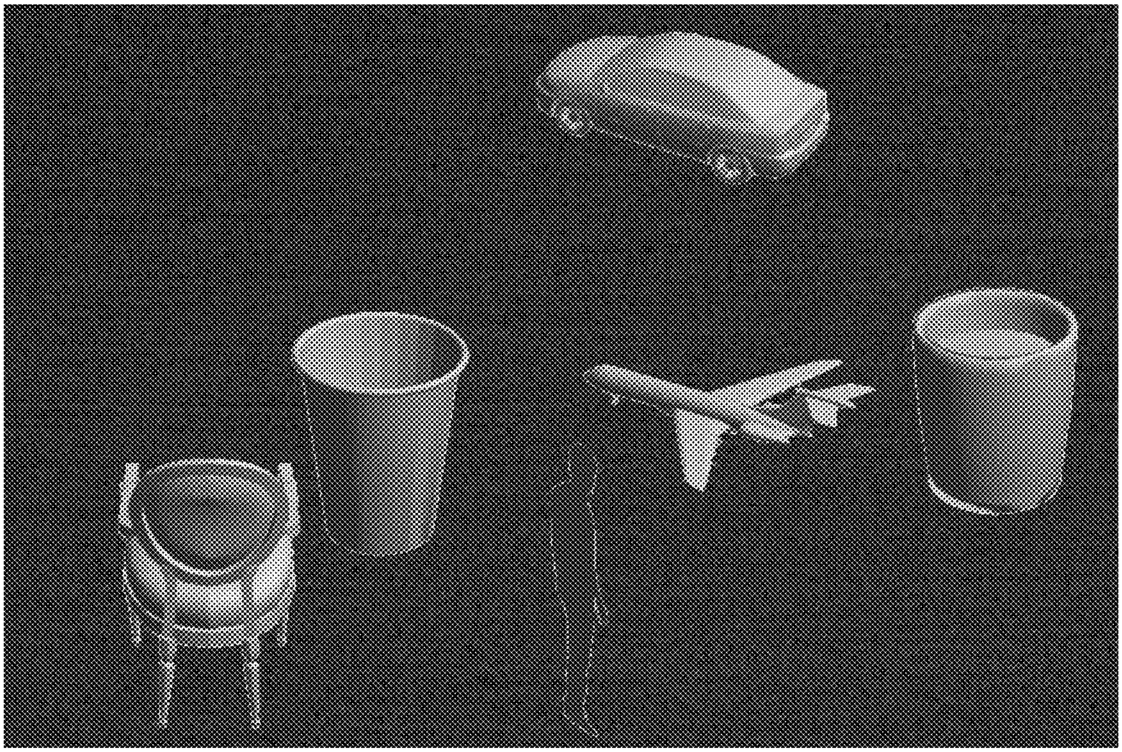
FIG. 3 to 10 are actual examples of input and output from the exemplary embodiment of the disclosed invention TcNet2; in which FIG. 3, as an example, is an input image with 5 categories of 'airplane', 'car', 'person', 'cup' and 'chair'; in this exemplary case, the exemplary TcNet2 has 5 category contour branches, each branch would output contours of one of the 5 categories.
Figure 4:
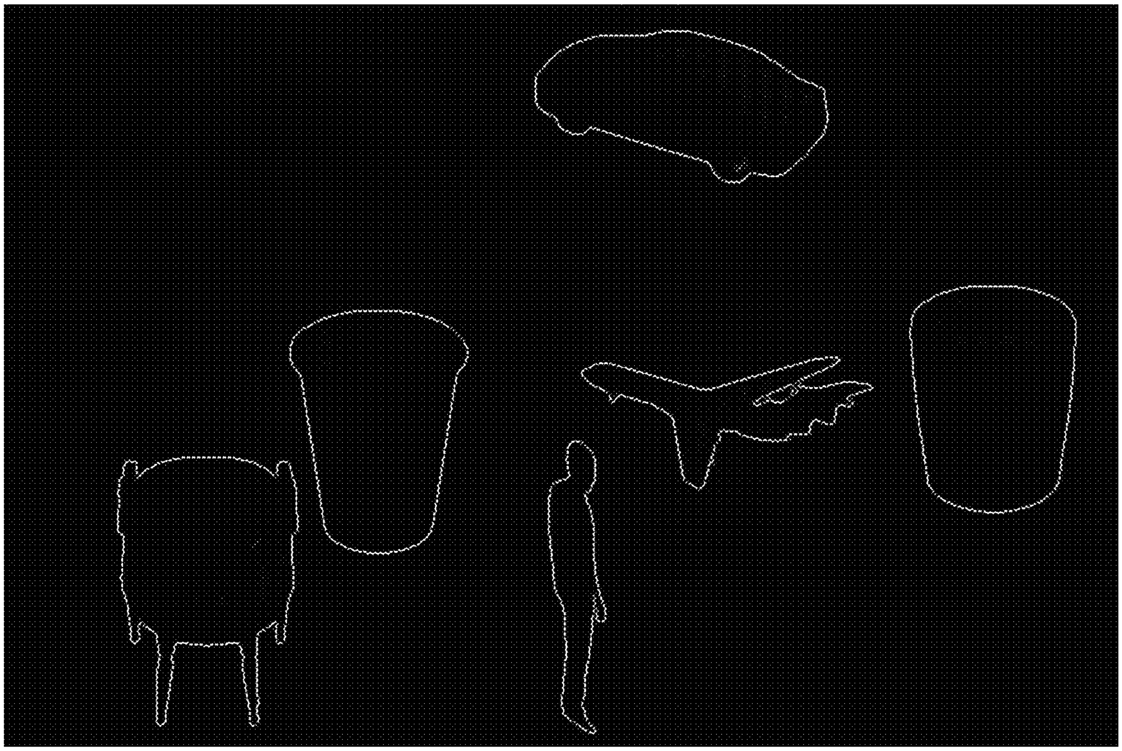

For the exemplary case of 2-channel border-ownership and N-categories, referring to FIG. 2 in which, to simplify the illustration, 6021 is the same as Encoder Pyramid 5009 in FIG. 1, 6003 is the same as Decoder Pyramid 5017 in FIG. 1, 6005 is the same as Decoder Pyramid 5047 in FIG. 1, 6007 are the same as Decoder Pyramid 5057,5059 in FIG. 1, when TcNet2 is evaluated with an input image 6001 after TcNet2 is trained, the TcNet2 will output a 1+2+N-channel map including 1-channel all-contour map 6011, 2-channel border-ownership map 6013 of all-contours, and N channels of 1-channel per-category contour maps 6015 with one channel per category in which only contours of particular category objects appear. The dot (inner) product 6009 of border-ownership map and a per-category contour map will generate the border-ownership map 6017 for occluding contours of objects in a particular category in the input image. In practice, it may need one (or multiple, I use only one) appropriate threshold(s) on the 1+2+N-channel map (6011, 6013, and 6015 together) to suppress noise and generate clean contour and border-ownership map (as shown in examples in FIG. 4 to FIG. 10).

There are several obvious variants from TcNet2: (1) one variant from TcNet2 could exclude all-contour branch (5017 in FIG. 1, or 6003 in FIG. 2), our experiments show that the converging speed of training TcNet2 with excluding the all-contour branch is slower than that with including all-contour branch; (2) another variant from TcNet2 could exclude border-ownership branch, resulting in per-category contour maps only. These variants of TcNet2 could serve different purposes that are not foreseeable by the inventor.

Due to the dataset limitation and resource limitation, all our experiments tested on TcNet2 (or TcNet) do not include self-occlusion cases, so it is unknown whether or how well border-ownership coding disclosed in the Border-ownership Patent and the category-selective segmentation disclosed in this invention works on self-occlusion cases.

Although the present invention has been described with reference to preferred embodiments, the disclosed invention is not limited to the details thereof, various modifications and substitutions will occur to those of ordinary skill in the art, and all such modifications and substitutions are intended to fall within the spirit and scope of the invention as defined in the appended claims.

What is claimed is:

1. A method for representing category-selective occluding contours of objects from an image, where a said object in said image belongs to one of a plurality of different categories, at least comprising:

(a) using a plurality of first channels to represent said category-selective occluding contours of objects, where said occluding contours of said objects belonging to a said category are put into a said first channel, and a said category is associated with only one said first channel, wherein each said first channel represents occluding contours of objects of the corresponding category, rather than classification results.

2. A method according to claim 1 for coding border-ownership of category-selective occluding contours of objects of said image, wherein said occluding contours of objects are comprised of a plurality of relatively straight border segments, and said border ownership of said border segments are represented by a plurality of at least two second channels, and said border segments with opposite border owner sides are put into different said second channels, at least substantially comprising:

(a) said border ownership of said border segments of said objects belonging to a said category is represented substantially by an inner product of said first channel associated with said category and said at least two second channels of said border ownership, wherein said border ownership is associated with said occluding contours rather than classification results.

3. A method for generating category-selective occluding contours of objects from a given source image, where one said object in said image belonging to one of a plurality of different categories, using a neural network substantially comprising:

(a) training said neural network with a plurality of ground truth groups, where each said ground truth group is comprised of at least a ground truth image and a ground truth category-selective occluding contour representation associated with said ground truth image, wherein in said category-selective occluding contour representation a plurality of first channels is used to represent said category-selective occluding contours of objects in said category-selective occluding contour representation, and said occluding contours of said objects belonging to a said category are put into a said first channel, and a said category is associated with only one said first channel; and (b) after said training, input a said source image to trained said neural network, a said category-selective occluding contour representation can be produced as output from trained said neural network, wherein said representation comprises channel-based grouping of occluding contours rather than classification results.

4. A method according to claim 3 for generating border-ownership representation of category-selective occluding contours of objects from a given source image using a neural network, wherein in said border-ownership representation said occluding contours of objects are comprised of a plurality of relatively straight border segments and said border ownership of said border segments are represented by a plurality of at least two second channels, and said border segments with opposite border owner sides are put into different said second channels, substantially comprising:

(a) training said neural network with a plurality of ground truth groups, where each said ground truth group is comprised of at least a ground truth image, a ground truth said border-ownership representation associated with said ground truth image, and a ground truth said category-selective occluding contour representation of objects associated with said ground truth image; and (b) after said training, input a said source image to trained said neural network, a said border-ownership representation and a said category-selective occluding contour representation is produced as output from trained said neural network, wherein said category-selective occluding contour representation is independent of classification result.

5. A method according to claim 4 generating border-ownership representation of category-selective occluding contours of objects from a given source image using a neural network further comprising:

(a) said border-ownership representation of said occluding contours belonging to a said category is produced substantially by inner product of said second channels in said border-ownership representation and a said first channel belonging to said category in said category-selective occluding contour representation, wherein said first channel represents occluding contours of a corresponding category.

* * * * *